United States Patent
Bandi et al.

(10) Patent No.: US 10,530,784 B2
(45) Date of Patent: Jan. 7, 2020

(54) GEOLOCATION-BASED AUTHENTICATION CREDENTIALS

(71) Applicant: CA, Inc., Islandia, NY (US)

(72) Inventors: Sreenivasulu Bandi, Rangareddy District (IN); Gaurav Kumar, Munger (IN); Mitta Sarath Kumar, Hyderabad (IN); Shaik Mokhinuddeen, Hyderabad (IN)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 16/173,919

(22) Filed: Oct. 29, 2018

(65) Prior Publication Data

US 2019/0075120 A1    Mar. 7, 2019

Related U.S. Application Data

(63) Continuation of application No. 15/415,252, filed on Jan. 25, 2017, now Pat. No. 10,148,668.

(51) Int. Cl.
*H04L 29/06* (2006.01)
*G06F 16/29* (2019.01)
*H04W 12/06* (2009.01)

(52) U.S. Cl.
CPC .......... *H04L 63/107* (2013.01); *G06F 16/29* (2019.01); *H04L 63/0428* (2013.01); *H04L 63/08* (2013.01); *H04W 12/06* (2013.01)

(58) Field of Classification Search
CPC ... H04L 63/107; H04L 63/08; H04L 63/0428; G06F 16/29; H04W 12/06; H04W 12/00503
See application file for complete search history.

(56) References Cited

U.S. PATENT DOCUMENTS

| | | | | |
|---|---|---|---|---|
| 5,559,961 | A * | 9/1996 | Blonder | G06F 21/36 726/18 |
| 9,537,848 | B2 * | 1/2017 | McLaughlin | H04L 63/08 |
| 10,148,668 | B2 * | 12/2018 | Bandi | H04L 63/107 |
| 2012/0164982 | A1 * | 6/2012 | Klein | G07C 13/00 455/411 |
| 2012/0331527 | A1 * | 12/2012 | Walters | G06F 21/6218 726/4 |
| 2013/0231135 | A1 * | 9/2013 | Garskof | G06F 21/35 455/456.1 |
| 2015/0230086 | A1 * | 8/2015 | Bentley | G06F 21/34 726/7 |
| 2016/0027079 | A1 * | 1/2016 | Schoeffler | H04N 5/23293 705/325 |
| 2016/0189161 | A1 * | 6/2016 | Eramian | G06Q 20/40145 705/44 |
| 2016/0212619 | A1 * | 7/2016 | Sarmah | H04W 12/06 |
| 2016/0219036 | A1 * | 7/2016 | Devkar | H04L 63/20 |
| 2016/0285886 | A1 * | 9/2016 | Arunkumar | H04L 63/107 |
| 2016/0345176 | A1 * | 11/2016 | DeWitt | G06Q 20/3224 |
| 2017/0078326 | A1 * | 3/2017 | Child | H04L 63/08 |

\* cited by examiner

*Primary Examiner* — Matthew Smithers
(74) *Attorney, Agent, or Firm* — Pillsbury Winthrop Shaw Pittman, LLP

(57) ABSTRACT

Provided is process including receiving a request to authenticate a user; sending instructions to present an authentication user interface including a geographic map; receiving geolocations on the geographic map selected by the user; comparing the geolocations to a sequence of geolocations in an authentication credential to determine whether to authenticate the user.

20 Claims, 6 Drawing Sheets

GEOLOCATION-BASED AUTHENTICATION CREDENTIALS

CROSS-REFERENCE TO RELATED APPLICATIONS

The present application is a continuation of U.S. patent application Ser. No. 15/415,252, titled GEOLOCATION-BASED AUTHENTICATION CREDENTIALS, filed 25 Jan. 2017. The contents of each afore-mentioned patent filing is hereby incorporated by reference.

BACKGROUND

1. Field

The present disclosure relates generally to distributed applications and, more specifically, to geolocation-based authentication credentials.

2. Description of the Related Art

Knowledge-based authentication credentials, such as passwords, are used in a variety of computer systems. For example, access is often selectively provided to various resources on websites, or via mobile native applications, based on whether a user can demonstrate knowledge of certain information, like a password.

In many cases, knowledge-based authentication credentials are defeated through brute force attacks, by which the credential is guessed through repeated attempts. To mitigate these attacks, users are often encouraged, and in some cases required, to use relatively high entropy knowledge-based authentication credentials, such as relatively long passwords having relatively diverse characters, like numerals, capital letters, lowercase letters, and non-alphanumeric characters. One consequence of this approach, often, is that these high-entropy knowledge-based authentication credentials can be difficult for users to remember, leading to impaired user experiences, higher support costs dealing with forgotten credentials, or deliberate selection of memorable (and weak) passwords by users.

SUMMARY

The following is a non-exhaustive listing of some aspects of the present techniques. These and other aspects are described in the following disclosure.

Some aspects include a process, including: receiving, via a network, a request to authenticate a user of a computing device; sending, via the network, the computing device instructions to present an authentication user interface, the authentication user interface including a geographic map and instructions that cause the computing device to indicate geolocations selected by the user within the geographic map; receiving, via the network, a user identifier; receiving, via the network, geolocations on the geographic map selected by the user and a sequence in which the geolocations were selected; accessing, based on the user identifier, a record corresponding to the user and having an authentication credential of the user, wherein the authentication credential specifies a sequence of geolocations; comparing the geolocations on the geographic map selected by the user and sequence in which the geolocations were selected to the sequence of geolocations in the authentication credential to determine whether to authenticate the user; sending, via the network, a result of the determination of whether to authenticate the user, wherein the result of the determination is based on whether the user is able to demonstrate knowledge of the sequence of geolocations of the authentication credential.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
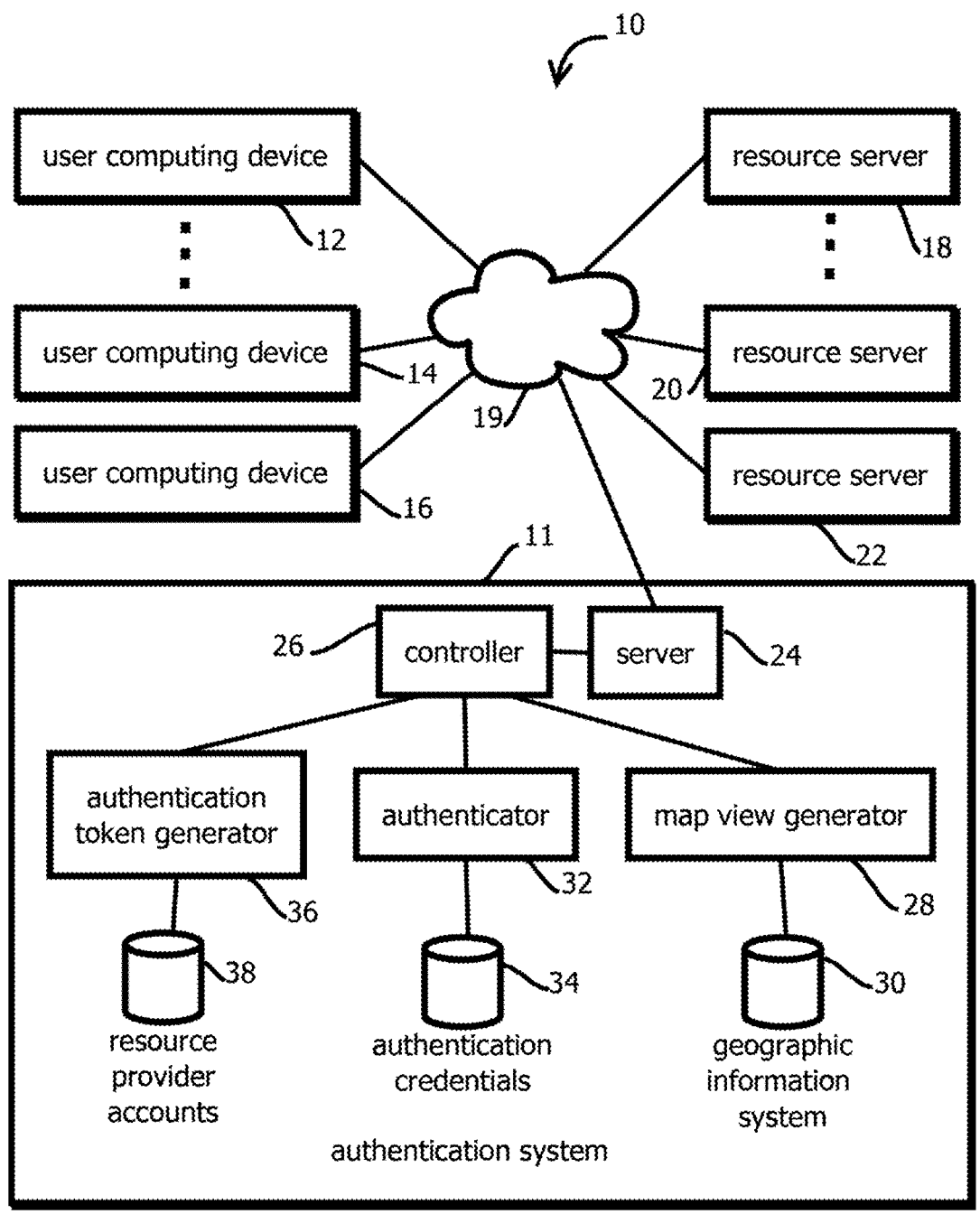
FIG. 1 illustrates an authentication system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer security and human-computer-interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Certain types of knowledge-based authentication credentials that are easier for users to remember have been proposed. Examples include having the user identify a geographic place, or geolocation. Often users find geographic places to be relatively memorable, and the universe of places from which users selects is usually relatively large, making the credential relatively high entropy.

However, existing implementations of this approach present a number of issues. Often, these implementations are based on a single geographic place, which can leave the credential susceptible to brute force attacks as computer speed increases. Further, many existing implementations are susceptible to attacks by which the credential is leaked to others with a view of the user's computing device display, for example, over their shoulder when the place is selected. Such attacks are a particular concern with geolocation-based credentials, as often the visual presentation of the user interface is viewable from a relatively long distance as compared to that of a text-based input, for instance, with a text password. Further, some existing approaches are difficult for users to use because the user interface makes it difficult for users to distinguish between selecting a larger geographic area or a subregion within that geographic area, for instance, whether the user is selecting a continent, a country, a state, a city, or a street, all corresponding to a place on a map in which the user clicks. (The discussion of some of these issues with existing systems, however, should not be taken as a disclaimer of embodiments presenting these issues, as various independently useful techniques are described herein, some of which may address some but not all of these issues as a result of various engineering or cost trade-offs.)

FIG. 1 depicts a computing environment 10 having an authentication system 11 configured to mitigate some of the above-described issues, and in some cases, all of these issues or other issues.

a. In some embodiments, the authentication system 11 may register a sequence of geographic places as a user's authentication credential and, later, authenticate the user in response to the user demonstrating knowledge of the sequence of geographic places, for instance, with selections on a map.
b. In some embodiments, the system 11 may disambiguate selections between overlapping geographic regions based on a variety of techniques described below to distinguish, for example, between a selection of a country and a selection of a state in that country, both corresponding to a location selected by the user in a map.
c. Further, some embodiments may impede "over the shoulder" attacks like those described above with various techniques, such as permitting the user to randomly omit a threshold amount of geolocations in a registered sequence, permitting the user to add a threshold amount of extraneous geolocations beyond those in a registered sequence, or permitting the user to type the name of one or more of the geolocations in a registered sequence.

In some embodiments, the sequence may be specified by a user selecting a start and end location and then selecting among a plurality of paths between those locations, in some cases distinguishing between paths having partially overlapping portions. With the variants of these approaches described below, in some cases in various combinations, some embodiments may facilitate use of relatively high entropy (e.g., more than 12 bits of information entropy per symbol and more than 24 bits per credential), relatively easy to remember, and relatively difficult to attack knowledge-based authentication credentials. Further, some embodiments may implement the system in a distributed application that allows a plurality of different resource providers to leverage the same authentication credential, without providing the authentication credential to the resource providers, thereby reducing the attack surface of the distributed system and reducing the number of credentials the user needs to remember.

In some embodiments, the system 10 includes the authentication system 11, a plurality of user computing devices 12, 14, and 16, a plurality of resource servers 18, 20, and 22, all connected via the Internet 19. The present techniques are illustrated with reference to a software-as-a-service architecture, but embodiments are also consistent with on premises implementations, for instance, where Internet 19 is replaced with a local area network or private network. Embodiments are also consistent with single-computer implementations, for instance, where the authentication system 11 is executed by a user computing device upon which the user seeks to access resources.

In some embodiments, the functionality described herein may be implemented by executing instructions stored on a tangible, non-transitory, machine-readable medium with one or more processors. In some cases, the medium may be distributed among a plurality of different computing devices, each having different subsets of the medium, and each executing different subsets of the instructions, for instance, in a distributed application. The term "medium," singular, is used generically to refer both to this distributed implementation and implementations in which the instructions are executed by and stored by a single computing device.

Three user computing devices 12, 14, and 16 are illustrated, but commercial implementations are expected to have substantially more, for instance, more than 1,000, and in many cases, more than 1 million user computing devices accessing the authentication system 11. In some cases, the authentication system 11 may be configured to service more than 100 concurrent authentication sessions with subsets of these computing devices. The user computing devices 12, 14, and 16 may be any of a variety of different types of computing devices, examples of which are described below with reference to FIG. 6 and which include laptop computing devices, desktop computing devices, mobile computing devices, cell phones, wearable computing devices, kiosks, set-top boxes, embedded computing devices, and the like. In some embodiments, the computing devices execute an operating system and, therein, a web browser or special purpose application (like a native application in a mobile computing device downloaded from a repository of applications hosted by a provider of the operating system) that presents the user interfaces described below and through which the user accesses various resources hosted by the resource servers 18, 20, or 22.

In the illustrated embodiment, three resource servers 18, 20, and 22 are illustrated, but embodiments are consistent with substantially more, for instance, numbering in the hundreds or thousands. In some embodiments, a different entity may operate each resource server, for instance, at a different uniform resource locator directed to a different domain. In some embodiments, some of the resource servers are web servers through which various software-as-a-service applications are accessible upon a user being authenticated, and some of the resource servers are application program interface servers that provide data to native applications or other special purpose applications executing on the computing devices after a user is authenticated.

In some embodiments, the authentication system 11 includes a server 24, a controller 26, a map view generator 28, a geographic information system 30, an authenticator 32, an authentication credential repository 34, an authentication token generator 36, and a resource provider account repository 38. In some embodiments, the server 24 may listen to one or more ports of the authentication system; route requests received on those ports to the controller 26; and send to other devices responses from the controller 26, which may coordinate the operation of the other components of the authentication system 11 and implement the routines described below with reference to FIGS. 2 and 3. In some embodiments, the server 24 is a nonblocking server operative to asynchronously service a relatively large number of requests concurrently (e.g., more than 100 or more than 1,000). In some embodiments, the various components of the authentication system 11 may be replicated in multiple instances that concurrently service different ones of incoming requests, for instance, servicing different ongoing concurrent authentication sessions with different user computing devices 12, 14, and 16. In some embodiments, the map view generator 28 is configured to determine a map extent to present in a user interface for the user to register their credential or demonstrate knowledge of a previously registered credential. The map extent may be a range of latitude and longitude coordinates displayed within a map display area of a user interface. In some cases, the selection may be based on various criteria, as described below with reference to FIGS. 2 and 3.

In some embodiments, the geographic information system 30 stores records about geographic areas, for instance, the entire world, a region thereof, or fictional worlds, like in video games. In some cases, this information includes images or vector graphics descriptors by which maps are displayed on user computing devices. In some cases, the images are stored as a plurality of tiles that may be combined (e.g., with more than 4 adjacent, concurrently displayed tiles in a UI) by the user computing devices to display a map or added to previously sent tiles to change a map extent, for instance, when panning or zooming. In some cases, the tiles depict the geographic areas at different levels of specificity, for instance, in a pyramid file, with some tiles depicting the geographic area at a relatively low zoom level and others at a relatively high zoom level. Thus, the same geolocation may be depicted in a plurality of different tiles corresponding to different zoom levels, for instance, five or more. In some cases, the depictions of geographic areas are also stored in a plurality of different styles, for instance, in a satellite view having images taken from satellite or other overhead cameras, like in an airplane, a diagrammatic view of a map, a topographical map, or combinations thereof. In some cases, some of the images depict geographic areas from a plurality of different perspectives, for instance, at a 45° angle relative to vertical from the north, south, east, and west, or in a horizontal perspective, for instance, from the street level.

In some embodiments, the geographic information system 30 also stores records of geographic places (e.g., areas, points of interest, roads, towns, municipal areas, states, nations, rivers, mountains, bodies of water, etc.), each geographic place having a nominal geolocation identifier that distinguishes the geographic place from other geographic places in the geographic information system 30. Examples include names of geographic places, like the name "Texas" or the name "Austin," in contrast to cardinal geolocation identifiers, like latitude and longitude coordinates that may range within an area designated by a nominal geolocation identifier, for instance, the state of Texas includes a large range of different cardinal geolocation coordinates. In some cases, a nominal geolocation identifier may be expressed as geographic coordinates that serve as a canonical identifier of the geolocation, for instance, a centroid of the geographic area being identified. In some embodiments, each nominal geolocation identifier may be associated with a geographic area to which the identifier pertains, for instance, a polygon having vertices that are latitude and longitude coordinates and defines the boundaries of a geographic area, or a set of grid squares that are each more than 50% within a geographic area, e.g., squares in the military grid reference system (MGRS). As described below, some embodiments may determine whether a user selected coordinate is within a geographic area corresponding to a nominal geolocation identifier with reference to these data structures, for instance, determining whether a point is within a polygon or whether a point is within a grid square among those associated with a geographic area.

A point may be determined to be within a polygon with a variety of techniques. Some such embodiments may execute (e.g., on the device 12-16 or system 11) a ray-casting algorithm or a winding number algorithm to determine whether a current location is within a polygon. For example, some embodiments may determine whether a selected geolocation is within a polygon corresponding by counting a number of times a ray originating at the selected geolocation intersects a side of a polygon defining a geographic area and, then, determining whether the selected geolocation is within the geographic area based on whether the count is odd (corresponding to being inside) or even (corresponding to being outside). In some such implementations, every edge of the polygon may be tested for intersection with the ray, and vertices may be tested for intersection with the ray and tracked in memory as already having been deemed intersected to avoid double counting of vertices for adjacent sides. Alternatively, or additionally, the current location may be compared to a geographic area by summing angles between rays extending from the selected geolocation and vertices defining each sequential side of a polygon. Some embodiments may deem the selected geolocation to be inside the geographic area in response to determining that the sum is non-zero. Some embodiments may calculate such angles according to an inverse trigonometric function, or to expedite processing and avoid computationally expensive calculations, some embodiments may leverage the closed shape of the polygon and simply account for which quadrant each additional edge places each sum.

In some embodiments, the geographic information system 30 may be remotely hosted by a third party relative to the authentication system 11, for instance, by an online map service provider. In some embodiments, the map view generator 28 may generate a uniform resource identifier (URI) that encodes information about a map extent to be displayed, and that URI may be embedded in a webpage or other instructions sent to a user computing device which, upon rendering the instruction in the webpage or otherwise executing received instructions, requests the corresponding content from the third party provider with the URI, thereby conveying the selected map extent to the third party sever via the user computing device at issue. The third party server may then send map information (e.g., the above-described tiles or vector graphics resources) to the user computing device from which the request was received.

In some embodiments, the authenticator 32 is configured to determine whether user supplied credentials match those in the authentication credential repository 34 and, in response to detecting a match, indicate that the user is authenticated, or in response to detecting a failed match, indicate the user is not authenticated. In some embodiments, the authenticator 32 may execute various routines described below by which sequences of geographic locations are entered by the user in different formats, some of which are more difficult to view over the user's shoulder, for instance, with a typed name of one of several geolocations in a sequence. Further, in some embodiments, the authenticator 32 is configured to accommodate various types of noise added by the user to the authentication input, for instance, randomly omitting a geolocation or randomly adding a geolocation to defeat over-the-shoulder attacks. To these ends and others, in some embodiments, the authenticator 32 is configured to receive an input, and attempt to match a plurality of different permutations based on the input to an authentication credential or attempt to match the input to a plurality of different permutations of the authentication credential, as described below.

In some embodiments, the authentication credential repository 34 includes a plurality of records, each record corresponding to an individual user and indexed by a user identifier. In some embodiments, each record may include a sequence of geolocations that serve as a knowledge-factor authentication credential for a user associated with the corresponding user identifier. The geolocations in the sequence may be stored in a variety of formats, such as a linked list, a tuple, a two-dimensional matrix with a column indicating geolocation and another column indicating order, an object in an object-oriented programming language, and the like. Geolocations may be encoded in a variety of different formats. In some embodiments, the geolocations may be encoded as latitude and longitude coordinates, grid square identifiers, or nominal geolocation identifiers. In some embodiments, each geolocation in the sequence may be associated with a geolocation type, which may be one type among a plurality of types that describe different types of geolocations having varying specificity with respect to geographic areas, like continents (less specific), countries, states, cities (more specific), ZIP Codes, neighborhoods, roads, addresses, and the like.

In some cases, a user identifier may be associated with multiple geolocation sequences, and each geolocation sequence may be associated with a different resource server 18, 20, or 22, corresponding to different authentication credentials for different resources. Or in some embodiments, the same authentication credential may be used for multiple resource servers 18, 20, or 22.

In some embodiments, during registration, the user may designate a geographic area as an area in which inputs are to be ignored when authenticating, and that geographic area may be designated in the record having the authentication credential, such that when a user inputs a authentication credential, the user may select a relatively large number of geolocations within the ignored area to obfuscate the credential to somebody looking over their shoulder. In some embodiments, the user may designate several such areas, for instance, with a white list or blacklist. When authentication credentials are received including geolocations within these excluded areas, some embodiments, may filter from the received authentication credential geolocations in those areas before authenticating.

In some embodiments, the authentication token generator 36 may generate an authentication token for use by a specific one of the resource servers 18, 20, or 22, e.g., one receiving the token via a user computing device and using the token to determine whether to grant access to resources for the corresponding user computing device. In some embodiments, the tokens may include a cryptographic hash and may be associated with, for instance based on, a corresponding resource provider account for the resource server providing access or getting access, as stored in the resource provider account repository 38. For example, in some cases, a user computing device may be authenticated, and some embodiments may generate an authentication token, retrieve a URI corresponding to the resource server to which access is being granted, and send the URI with the authentication token appended thereto in a redirect instruction to one of the user computing devices, which upon executing the redirect instruction, may request resources from a corresponding resource server with the request including the authentication token. The resource server may parse the authentication token from the request and determine whether to grant access or use the authentication token to secure access from some other server.

In some embodiments, the illustrated data repositories 30, 34, and 38 may be relational databases or nonrelational databases, for instance, document databases, memory images, or keyvalue-pair stores. In some embodiments, the various data repositories may be distributed, for instance, with redundant copies of data stored on different computing devices such the distributed system is resilient to failure of one computing device, or in some cases, the various data repositories or subsets thereof may be stored on a single computing device.

Figure 2:
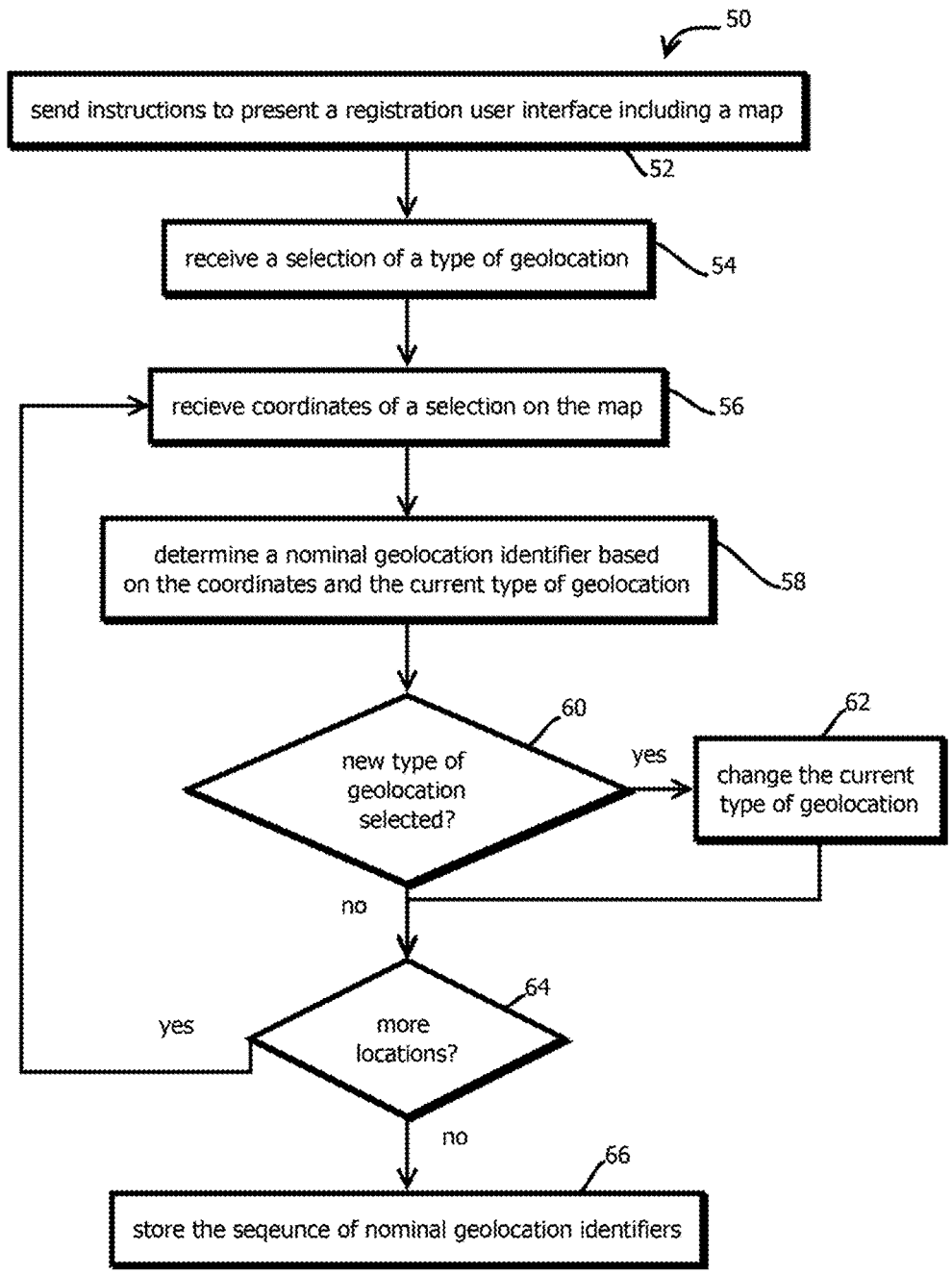
FIG. 2 illustrates process to register a map-based authentication credential in accordance with some embodiments.

FIG. 2 shows an example of a process 50 that may be executed by the controller 26 during a registration process for enrolling a new user with the authentication system 11 or for configuring a credential for an existing user. Some embodiments begin with sending instructions to present a registration user interface including a map, as indicated by block 52, for instance to one of the above-described user computing devices 12, 14, or 16. In some cases, the request for the user interface may be received from the user computing device before sending the instructions. In some embodiments, the instructions are instructions that when executed cause the computing device to render a webpage, for instance, hypertext markup language, cascading style sheets, JavaScript™, and the like. In some embodiments, the instructions are data in an API response, for instance, encoded in a serialized hierarchical data format, like JavaScript™ object notation (JSON) or extensible markup language (XML), sent to a special-purpose application, like a native mobile application, executing on one of the user computing devices described above. In some cases, the instructions are sent in a single transmission, or in some cases, the instructions are sent over the course of a series of exchanges with the user computing device, for instance, some instructions may be sent to the user computing device, and the user computing device may determine that some of those instructions reference other instructions that are remotely stored, which may be subsequently requested by the user computing device and sent by the system 11. Or in some cases, instructions may be sent to present a first part of the user interface, for instance, a webpage in which the user name is entered and submitted, and then other portions of the instructions may be sent to present another portion of the user interface, for instance, a map in which the user selects a sequence of geolocations. In some cases, the operations of block 52, and the other operations described herein, may be executed in a different sequence than that illustrated, in some cases, with portions of one block being executed after portions of a subsequently described block or vice versa.

Next, some embodiments may receive a selection of a type of geolocation, as indicated by block 54. In some cases, the received selection may be received from one of the user computing devices described above. The received selection may be received in a variety of different formats, ranging from pixel coordinates, to latitude and longitude coordinates, to nominal geolocation identifiers, depending upon whether some or all of the following operations described with reference to block 58 are performed by the user computing device or the authentication system 11.

Next, some embodiments may determine a nominal geolocation identifier based on the coordinates and the current type of geolocation, as indicated by block 58. In some embodiments, the sent instructions may include an event handler, such as an onClick or onTouch event handler, that subscribes to events detected by the operating system or the browser upon user input. In some embodiments, the events may be provided to the event handler with various parameters, such as screen coordinates indicating a location of a touch event or a click events. In some embodiments, the screen coordinates indicate a location on the display or a location within a portion of the display, like within a canvas element in which the map is displayed or an I-frame in which the map is displayed.

Screen coordinates may be translated into nominal geolocation identifiers with a variety of techniques, on the user computing device, in the authentication system, or in a process that spans both components. In some embodiments, the event handler may be sent with the above-described definitions of geographic areas corresponding to nominal geolocation identifiers, such as lists of vertices describing bounding polygons of geographic areas, sets of tiles, or the like. In some embodiments, these geographic coordinates may be translated into pixel coordinates either by the event handler or by the authentication system 11 before sending. Some embodiments, for instance with the event handler executed client side, may compare a pixel coordinates of a received event to each of the definitions of geographic areas translated into pixel space to determine which nominal geographic identifier is selected. In some embodiments, definitions of geographic areas other than those in the user's authentication credential may be included with the instruction sent to the event handler to obfuscate which geographic areas are in the credential to a party inspecting source code or data sent to a browser, e.g., by monitoring network traffic.

In some embodiments, the definitions of the boundaries of geographic areas (corresponding to nominal geographic identifiers) may be sent without translating those definitions that into pixel space of the display, and in some embodiments, the event handler executed by the user computing device may include a routine to translate a received selection in pixel space into a latitude and longitude or other description of a geolocation point. Some embodiments may then compare (e.g., with the event hander) this translated selection against the definitions of geographic areas in geolocation space. In some embodiments, each selected geographic area identifier (or associated data) may be salted by appending a random string to obfuscate the size of the amount of data consumed in a transmission identifying the geographic area, for instance, by appending a sufficient number of characters to a nominal geolocation identifier sufficient to attain a fixed size greater than all geolocation identifiers. In some embodiments, these appended characters may be random characters. In some embodiments, the salted value may be encrypted, and some cases with multiple layers of encryption, for instance, with layers of encryption applied before Transport Layer Security (TLS) encryption is applied for transmission.

In some embodiments, some or all of the translations between pixel space and nominal geolocation identifiers may be performed by authentication system 11. For instance, in some embodiments, the above-described event handler may transmit pixel coordinates to the authentication system 11, and the authentication system 11 may translate those pixel coordinates (in user-device display space) accordance into geographic coordinates. For example, the authentication system 11 may maintain session state data indicating a currently displayed map extent based on received panning and zooming requests from the user computing device and an initially sent map extent, and based on this state data, some embodiments may translate pixel coordinates into geolocation coordinates. Or in some cases, the user computing device may send the map extent with the pixel coordinates.

In some embodiments, the authentication system 11 may then use the techniques described above to translate those geolocation coordinates into nominal geolocation identifiers. In some embodiments, this may be accomplished with any of the above-describe techniques described as occurring client-side. In some cases, some of the translation may be performed client-side, for instance, the translation between pixel coordinates and latitude and longitude coordinates, while other portions are performed server side (at the authentication system 11), like the translation between latitude and longitude coordinates and nominal geolocation identifiers. This approach is expected to be relatively robust to interruptions in network connection, for instance, where state data indicating a current map extent is inaccurate due to a user panning or zooming within a map when network connections are momentarily interrupted and using cached data to accommodate the panning and zooming. Or in some embodiments, each selected pixel coordinate may be sent with a definition of the current map extent (e.g., a bounding rectangle defined with latitude and longitude coordinates of the area depicted on the user computing device), and embodiments may translate server-side with both the map extent and pixel coordinates.

As noted above, a user selection on a map can express a user intent to select any of a variety of geographic areas overlying the selection, for instance, a continent, a country, a state, a County, a ZIP Code, a Street address, a river, a mountain, a point of interest, or the like. Some embodiments may disambiguate these candidates and resolve the selection to a nominal geolocation identifier at the appropriate type of geolocation. In some cases, the selection may be made based on a current zoom level of the map, for instance, for instance continents may be selected when (e.g., in response to the map state indicating) the user is at a relatively low zoom level, countries may be selected at a next higher zoom level, states may be selected at a next higher zoom level. Or in some embodiments, the user interface may include a drop-down box, like that described below, where the user may input a type of geolocation to be associated with their (e.g., subsequent or previous) selection. In some embodiments, the type of geolocation determined for the nominal geolocation identifier may be determined by the authentication system 11 based on a next geolocation in the user's credential sequence of geolocations, for instance, if the next geolocation of the sequence is a city, then (in response) the next selection by the user may be converted into a city nominal geolocation identifier. In some embodiments, the system may select a nominal geolocation identifier based a geographic (or display) density of what is currently displayed on a map near a user selection, for instance, if the user selects the middle of an open plain in a state, with no cities or other landmarks (for instance within a threshold distance), some embodiments may determine that the user intends to select a state rather than a country nominal geolocation identifier, as the state-level is the most specific nominal geolocation identifier to which the selection can be resolved.

In some embodiments, the selection is mapped to a two-dimensional probabilistic distribution, such as a Gaussian distribution around the user selection in display space mapped to a geographic space. In some embodiments, each of these probabilistic distributions may be used to select a probability based on where a geolocation in the users credential sequence falls within the distribution, and some embodiments may sum these probabilities among a sequence of selections and determine whether the sum exceeds a threshold to authenticate the user. For instance, if a user selects relatively near each of a plurality of geolocations, the sum of probabilities may be relatively high and the user may be authenticated. But if the user selects relatively far from two of five, and close to three of the five, the sum of probabilities may fail to satisfy the threshold and the user may not be authenticated.

Next, some embodiments may determine whether a new type of geolocation is selected, as indicated by block 60. For instance, the user may zoom in or out or change a selection and a drop-down box to select between countries, states, cities, and the like, to be mapped to their selection within the map. In response to determining the type of geolocation is selected, some embodiments may change the current type of geolocation, as indicated by block 62, an attribute of program state which may be applied to subsequent selections. Otherwise, embodiments may proceed to block 64, and determine whether the user will submit more geolocation selections in the sequence. For example, some embodiments may determine whether the user has selected more than a threshold amount of geolocations, such as more than three, more than five, or more than ten, and upon determining that the user has exceeded this threshold, some embodiments may determine whether the user has selected a submit input indicating an intent to finish the registration process.

Upon determining that the user intends to select more locations, some embodiments may return to block 56.

Otherwise, some embodiments may proceed to block 66 and store the sequence of nominal geolocation identifiers, or other types of geolocations, for instance the above-described probabilistic distributions or geolocation coordinates. In some cases, the sequence may be stored in the authentication credential repository 34 described above.

In some embodiments, the user may register other types of geolocation sequences, for instance, routes between a starting geolocation selected by the user and an ending geolocation selected by the user. Some embodiments, upon receiving the starting and ending geolocations, may determine an amount of candidate paths between the geolocations, for instance, by determining whether there are more than a threshold amount of candidate paths and rejecting the selections in response the user not exceeding the threshold. Some embodiments of the system 11 may send instructions to present the candidate paths and, then, receive a selection among the candidate paths. In some cases, the sequence of geolocations may correspond to or express the selected candidate paths. In some cases, some of the paths may overlap for portions of their distance, as described below with reference to FIG. 5, and some embodiments may disambiguate between those paths by requiring the user to select (e.g., including determining whether the user has selected) a portion of the path that is unique among the candidate paths.

Figure 3:
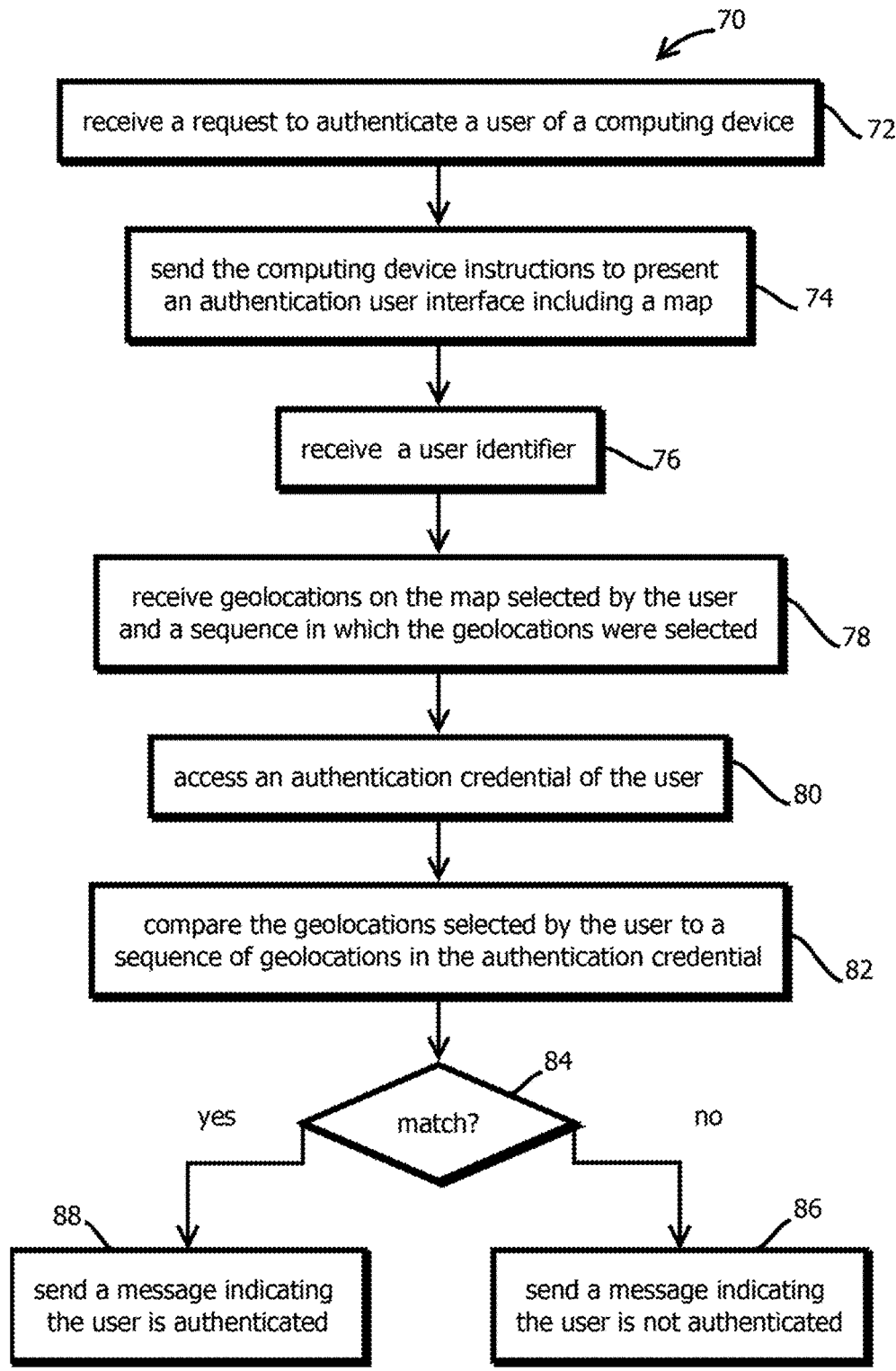
FIG. 3 illustrates a process to authenticate a user with a map-based authentication credential in accordance with some embodiments.

FIG. 3 shows an example of a process 70 that may be performed by the above-described authentication system 11 when authenticating a user of a computing device. In some embodiments, the process 70 begins with receiving a request to authenticate a user of a computing device, as indicated by block 72. In some cases, the request is received from a user computing device attempting to access resources from one of the resource servers described above, and the resource server may send a response embedding a reference, such as a URI pointing to the authentication system 11, which may prompt the user computing device to send the request to the system 11.

Next, some embodiments may send the computing device instructions to present an authentication user interface including a map, as indicated by block 74. The discussion of the user interface instructions above applies to this user interfaces well, for instance, the instructions may be sent through multiple exchanges, and in some cases, portions of the instructions or all the instructions may be sent after performing subsequently described operations. And in some cases, the instructions may take the form of instructions sent to a web browser or a special purpose application, in some cases, taking the form of data sent to an application program interface that causes the receiving computing device to present the user interface, which may evolve over time.

In some embodiments, the map may be initialized to a default extent, for instance, based on a geolocation associated with an Internet Protocol (IP) address from which the request is received, based on a starting geolocation in a credential sequence, based on (e.g., including each of) the geolocations in a user's credential sequence, depending upon trade-offs between ease-of-use and the risk of leaking information about the user's credentials.

In some embodiments, the map may include user interfaces by which the user pans and zooms to change the map extent. Examples include a slider bar like that described below with reference to FIG. 4 and event handlers that collect the text and handle click or touch and drag events or arrow keypress events indicating panning operations. In some embodiments, corresponding event handlers may determine whether resources are present in memory of the user device, such as browser cache memory, to service the request and display the portions of a map revealed by the adjustment. Upon determining that the resources, for instance images or vector graphics descriptors, are not available, some embodiments may send a request to the authentication system 11, which may retrieve the corresponding resources from the geographic information system 30 and send them to create an updated display. Or as noted above, some embodiments may offload delivery of map resources to a third party server.

In some embodiments, to prevent leakage of information about user credentials, some embodiments may obfuscate transmitted map resources. For instance, an adversary may infer based on the file sizes of transmitted images, a current map extent or changes thereto, in some cases even if the data is encrypted. Accordingly, some embodiments may salt transmitted resources using the techniques described above and encrypted transmitted resources. Further, some embodiments may request, or send without a request, resources different from those pertaining to the areas of a map revealed by panning or zooming, like randomly selected map resources or dummy data, to make it less likely that bandwidth consumption provides a signal indicative of the current map extent during user navigation. Or some embodiments may forego this extra protection to simplify system design and offer lower latency responses, which is not to suggest any other feature herein is not also amenable to variation.

Next, some embodiments may receive a user identifier, as indicated by block 76. In some cases, the user identifier may be retrieved from persistent browser accessible memory, or other persistent memory accessible to special purpose application executing on the user computing device. For example, some embodiments may send a key value to the user computing device by which a user identifier is retrieved from persistent browser accessible memory, such as a cookie, localStorage, a SQLite database, or the like.

Next, some embodiments may receive geolocations on the map selected by the user and a sequence in which the geolocations were selected, as indicated by block 78. In some embodiments, this operation includes any of the various ways in which selections are received in the description above with reference to blocks 56 and 58 and may include the various techniques for translating selections into nominal geolocation identifiers or probability distributions. Or in some cases, the received geolocations are received in the form of a starting and ending geolocation and a selection among a plurality of paths, for instance, by selecting a non-overlapping portion among the candidate paths in accordance with the techniques described below with reference to FIG. 5. In some embodiments, the above-described encryption techniques for transmitting selected geolocations may also be used.

Next, some embodiments may access an authentication credential of the user, as indicated by block 80, for instance based on the received user identifier. In some cases, the authentication credential may be indexed according to the user identifier, for instance, based on a hash table listing entries in order of a hash key formed from the user identifier, or based on a binary search of the authentication credentials listed in sorted order according to the user identifier, both to expedite searches of authentication credentials and provide relatively low latency authentication operations. Often, users are sensitive to latency as a smallest 200 ms, and systems searching tens or hundreds of millions of records may exceed these thresholds without data structures designed to expedite query responses. That said, embodiments are also consistent with slower approaches, for instance in smaller systems. In some embodiments, accessing the authentication credential includes submitting a query to the authentication credential repository 34 selecting for the user identifier and loading into program state of the authenticator 32, for instance, in a variable, the authentication credential registered by the user, for instance, using the process of FIG. 2.

In some embodiments, both during registration and authentication, a subset of the geolocations in the sequence of the credential may be entered by typing a name of the geolocation, for example, in a text box input presented on a user computing device. In some cases, characters of the typed name may be displayed for a threshold amount of time on the user computing device, such as one second, and the in the typed characters may be replaced in the display with an asterisk or other wildcard character. These geolocations may be converted into nominal geolocation identifiers or may be expressed as nominal geolocation identifiers and included as a type of selection including other selections made on the map in the credential. As a result of this type of input, is expected that it will be relatively difficult for an attacker looking over the user's shoulder to obtain the entire authentication credential, as it is expected to be more difficult to view the typed characters from a distance than it is to view the selections on a display screen of a map.

Next, some embodiments may compare the geolocations selected by the user to a sequence of geolocations in the authentication credential, as indicated by block 82. This comparison may take any a variety of different forms with varying trade-off between security, ease-of-use, and speed. For example, some embodiments may determine whether every nominal geolocation identifier indicated by a user selection, in sequence, matches exactly a nominal geolocation identifier, at the corresponding location in the sequence, in the authentication credential.

Some embodiments may determine whether there is a more than a threshold amount of correspondence therebetween (e.g., whether the submission is within a threshold edit distance of the stored credential). For instance, some embodiments may determine whether the received sequence includes every nominal geolocation identifier in the authentication credential in the same sequence as the authentication credential after first filtering from the received sequence up to a threshold amount of other nominal geolocation identifiers that are not within the authentication credential, thereby facilitating efforts by users to obfuscate their credential by selecting a certain amount of other geolocations to impart noise. In other examples, the above whitelisting or blacklisting techniques may be implemented.

In some embodiments, the user may be permitted to omit a threshold amount of geolocations in the authentication credential, and embodiments may determine whether each submitted nominal geolocation identifier matches that of a corresponding location in the sequence or a location shifted by less than a threshold amount of positions in the sequence, for instance, permitting a shift of one or fewer.

In another example, the above-describe techniques for probabilistic authentication may be implemented, and embodiments may determine whether a probability distribution associated with each user selection (e.g., the probability of a portion of a Gaussian dome overlying the user selection) results in an aggregate probability that is greater than a threshold.

In some cases, the correspondence may be determined based on exact matches of nominal geolocation identifiers or some embodiments may apply non-binary scores as a result of the comparison, for instance, the probabilistic scores described above or some embodiments may determine whether the user identified a correct geolocation, but wrong nominal geolocation identifier due to a wrong type of geolocation being selected and apply a score of less than one corresponding to the selection. Some embodiments may aggregate, for example, average or sum, the scores and determine whether a resulting value exceeds a threshold to determine whether the user is authenticated.

Next, some embodiments may determine whether there is a match, as indicate by block 84, which may be performed as part of the comparison of block 82. In response to determining there is not a match, some embodiments may send a message (e.g., to the user computing device or a resource server) indicating the user is not authenticated, as indicated by block 86. Alternatively, some embodiments may send a message (e.g., to the user computing device or a resource server) indicating the user is authenticated, as indicated by block 88. In some cases, the authentication message may include retrieving a resource provider account record from the repository 38 of FIG. 1; selecting a URI of a corresponding resource server; and appending an authentication token to the end of the URI, for example, as a parameter of the URI. Some embodiments may send this URI as a redirect instruction to the user computing device, which may cause the user computing device to request resources from the corresponding resource server with a request that includes the authentication token, thereby conveying the authentication token to a resource server. In some embodiments, the resource server may determine based on the authentication token to provide resources to a user computing device, for example, access to a webpage or access to an application program interface. Or the resource server may send the authentication token to another resource server to access an API for information the user authorized to be retrieved.

Figure 4:
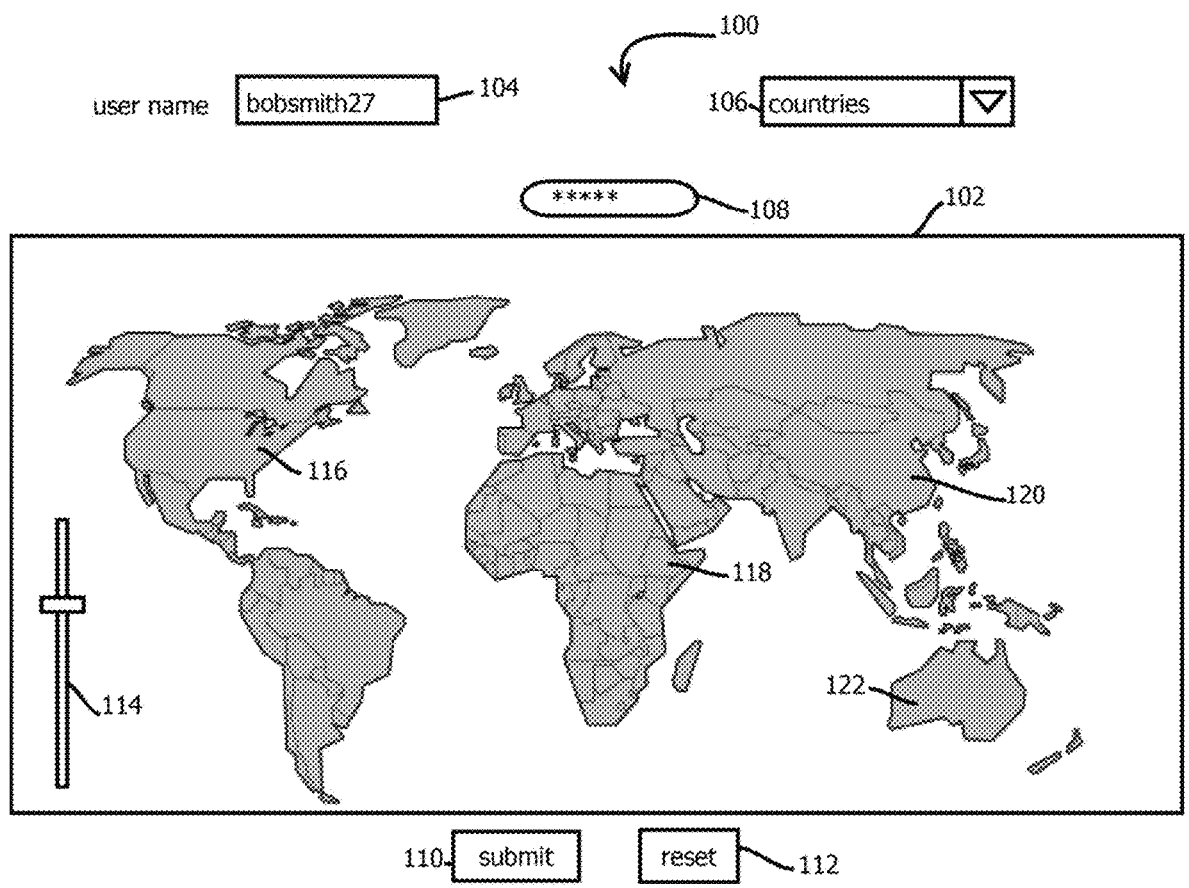
FIG. 4 illustrates a user interface to register or use a map-based authentication credential in accordance with some embodiments.

FIG. 4 shows an example of a user interface 100 that may be created with the instructions described above during registration or authentication. In some embodiments, the user interface 100 may be displayed within a browser window or within a display of a special purpose application executing on one of the above-described user computing devices 12, 14, or 16. In some embodiments, the user interface 100 may include a map 102, a username text box input 104, a geolocation type drop-down input 106, a submission input 110, a reset input 112, and a zoom input 114. In some cases, the user may select a variety of geolocations, such as the sequence 116, 118, 120, and 122, for instance, by clicking, touching, drawing boxes around, or looking at for more than a threshold amount of time in a virtual reality display, each of the geolocations indicated. In the illustrated example, the map extent is the entire world, but in some cases, the map 102 may be panned or zoomed to display another map extent, for example, just North America. In some embodiments, a user may enter a subset of the geolocations by typing a nominal geolocation identifier (or other value, like a proper noun that may not be a canonical geolocation identifier in the system 11, but uniquely identifies a geolocation). In some embodiments, each typed character may be displayed for a threshold amount of time, for instance, one second, and then replaced in the display 100 with an asterisk or other wildcard character to obfuscate attempts to view the entry, such as in text box input 108. Thus, at least one geolocation selected by the user may be relatively difficult to view from a distance over the user's shoulder. The submit button 110, upon selection, may cause the user computing device to send a signal indicating that the sequence is fully entered, and the reset button 112 may cause the user computing device to send a signal indicating that sequence selections entered so far are to be discarded.

Figure 5:
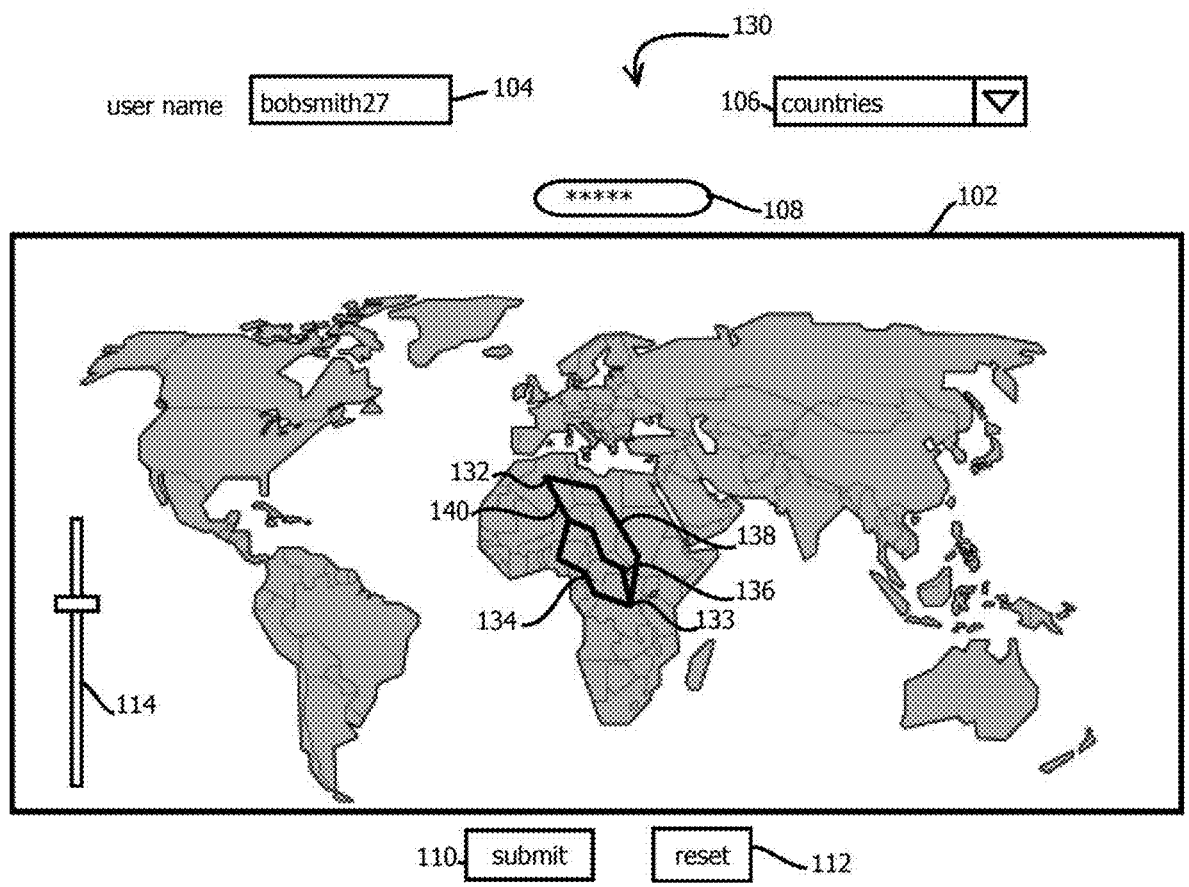
FIG. 5 illustrates another user interface to register or use a map-based authentication credential in accordance with some embodiments.

FIG. 5 shows another example of a user interface 130 having the features of the user interface 100, except that in this example, the sequence of geolocations is specified by the user selecting a starting geolocation 132, and ending geolocation 133, and then one or more of a plurality of paths 134, 136, or 138, between those geolocations 132 and 133. In some cases, portions of the routes may overlap, such as portion 140 of routes 134 and 136. Some embodiments may require the user to select (and perform operations to verify the selection of) a nonoverlapping portion, for example, rejecting selections of portion 140. Or in some cases, the overlapping portion itself may be part of the authentication credential, and selections of regions that are not overlapping may be rejected. The candidate paths may be determined with a variety of different pathfinding algorithms or by interfacing with various third-party online map resources, such as those provided by Google Inc. of Mountain View Calif. In some cases, pathfinding is performed with an A* search, Dijkstra's algorithm, or an any-angle pathfinding algorithm.

Figure 6:
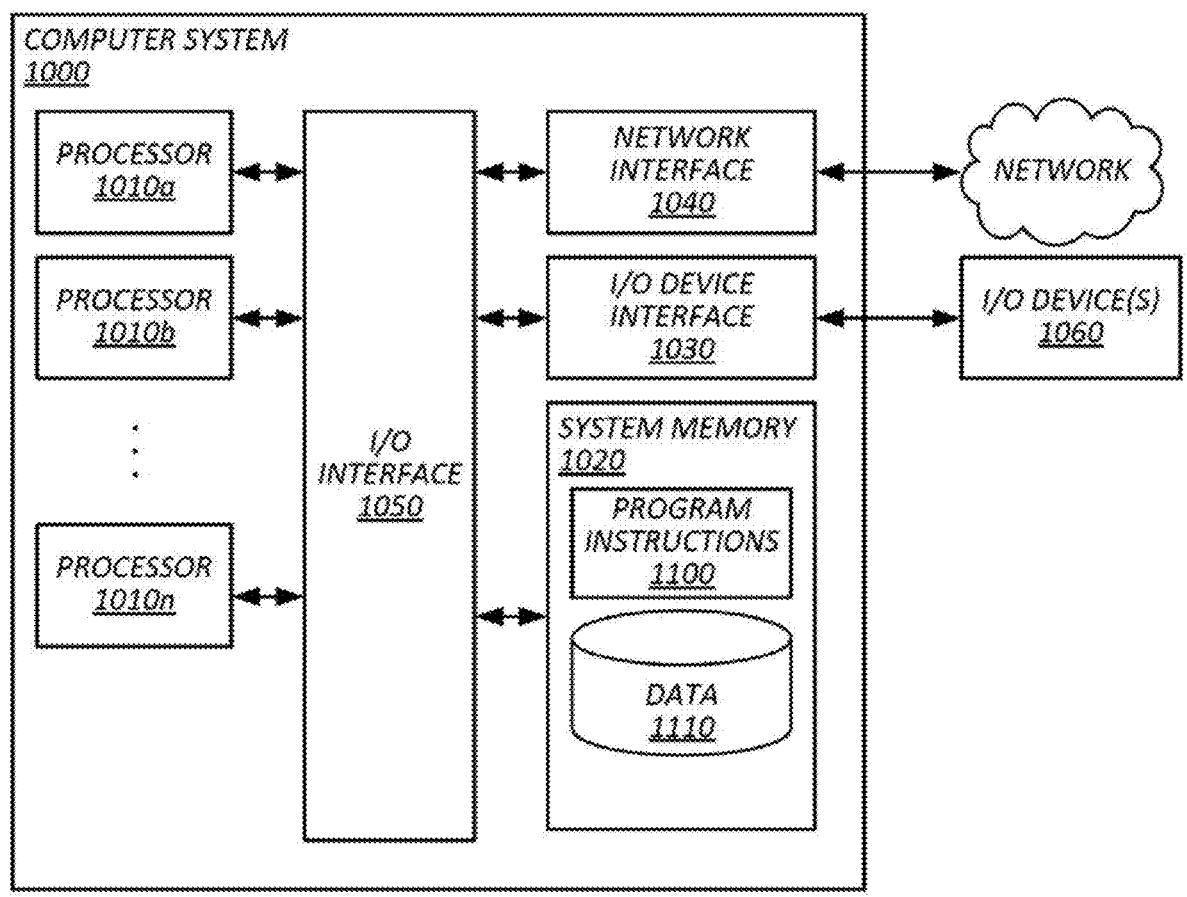
FIG. 6 illustrates a computer system by which the above processes and systems may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors $1010a$-$1010n$) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor $1010a$), or a multi-processor system including any number of suitable processors (e.g., $1010a$-$1010n$). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. An authentication system, comprising: one or more processors; and memory storing instructions that when executed by at least some of the processors effectuates operations comprising: receiving, via a network, a request to authenticate a user of a computing device; sending, via the network, the computing device instructions to present an authentication user interface, the authentication user interface including a geographic map and instructions that cause the computing device to indicate geolocations selected by the user within the geographic map; receiving, via the network, a user identifier; receiving, via the network, geolocations on the geographic map selected by the user and a sequence in which the geolocations were selected; accessing, based on the user identifier, a record corresponding to the user and having an authentication credential of the user, wherein the authentication credential specifies a sequence of geolocations; comparing the geolocations on the geographic map selected by the user and sequence in which the geolocations were selected to the sequence of geolocations in the authentication credential to determine whether to authenticate the user; sending, via the network, a result of the determination of whether to authenticate the user, wherein the result of the determination is based on whether the user is able to demonstrate knowledge of the sequence of geolocations of the authentication credential.

2. The system of embodiment 1, wherein: the user interface is presented in a web browser; the user identifier: is received before sending the authentication user interface; and is received as a result of sending instructions to the computing device to retrieve a value from persistent browser-accessible memory; uniquely identifies the user among more than 10,000 users having authentications credentials stored in a data repository with the record; the operations comprise, before sending instructions to present the geographic map, and after accessing the record, determining a map extent based on the sequence of geolocations of the authentication credential, wherein: the map extent has a zoom amount, the zoom amount is determined based on a geolocation type of at least some of the sequence of geolocations of the authentication credential, the geolocation type corresponds to a specificity by which corresponding geolocations are identified and being within a hierarchy of geolocation types of varying specificity with respect to geographic area; the instructions to present an authentication user interface comprise instructions to: retrieve some images from cache memory of the computing device, the images corresponding to a plurality of image tiles from which the geographic map is formed; present pan and zoom interfaces by which the user may cause the displayed geographic map to pan and zoom, respectively; after a pan or zoom request, determining that image tiles added to the map extent as a result of pan or zoom request are not stored in cache memory and, in response, sending a request for the image tiles added to the map extent along with image tiles not added to the map extent to obfuscate the direction of the pan or zoom; present a map view selector by which the user requests one of a plurality of different styles of maps including a satellite view; detect clicking or touching events on a display screen and within the geographic map and inputting the events to an event handler operative to: determine a geolocation by transforming pixel coordinates into corresponding geographic coordinates or a geolocation; salt and encrypt the geographic coordinates or geolocation to produce an encrypted value; and send the encrypted value over the network; comparing the geolocations on the geographic map selected by the user comprises: decrypting encrypted values and parsing geographic coordinates or geolocations from salted values; and either determining that each geographic coordinate is within a geolocation in the authentication credential having the same order in the sequence of the authentication credential, or determining that each geolocation matches the geolocation in the authentication credential having the same order in the sequence of the authentication credential; and sending a result of the determination comprises sending a redirect uniform resource identifier having an access token to the computing device.

3. The system of any one of embodiments 1-2, the operations comprising: receiving text indicating a subset of the geolocations in the authentication credential, the text having been typed by the user in a text box interface of the user interface specified by the instructions to present the authentication user interface; converting the text into one or more geolocations identified by typed text, wherein: comparing comprises comparing the sequence of geolocations in the authentication credential to both the geolocations identified by the typed text and geolocations selected on the geographic map by the user touching or clicking on the geolocations.

4. The system of embodiment 3, wherein comparing the sequence of locations in the authentication credential to both the geolocations identified by typed text and geolocations selected on the geographic map by the user touching or clicking on the geolocations comprises: determining a plurality of candidate sequences combining the geolocations identified by the typed text and geolocations selected on the geographic map by the user touching or clicking on the geolocations; and determining whether any of the candidate sequences match the sequence of geolocations of the authentication credential.

5. The system of embodiment 4, wherein the candidate sequences include every permutation of sequences by which the geolocations identified by the typed text and geolocations selected on the geographic map by the user touching or clicking on the geolocations are ordered in combination.

6. The system of embodiment 3, wherein: the text box interface is configured by the instructions to present the authentication user interface to not display typed characters after a threshold duration of time after each typed character is typed by the user.

7. The system of embodiment 3, wherein the typed text indicating a subset of the geolocations is less than a full name of the geolocation indicated by the typed text and has more than a threshold amount of characters of the full name of the geolocation indicated by the typed text.

8. The system of any one of embodiments 1-7, wherein: at least some of the geolocations on the geographic map selected by the user are received as coordinates; the operations comprise: after receiving the at least some of the geolocations on the geographic map selected by the user, determining nominal geolocation identifiers corresponding to received coordinates, the nominal geolocation identifiers being different from coordinates, uniquely identifying geolocations, and some nominal geolocation identifiers specifying geographic regions, wherein the nominal geolocation identifiers are determined by: determining a respective next geolocation in the authentication credential sequence of geolocations; determining a respective geolocation type within a hierarchical arrangement of geolocation types of the next geolocation; and based on the geolocation type, selecting the respective nominal geolocation identifier from among a respective plurality of identifiers of overlapping geolocations, some of the overlapping geolocations being sub-regions within larger regions; the authentication credential sequence of geolocations specifies a sequence of nominal geolocation identifiers; and comparing the geolocations on the geographic map selected by the user comprises determining whether the selected nominal geolocation identifiers match corresponding nominal geolocation identifiers in the authentication credential geolocation sequence.

9. The system of any one of embodiments 1-8, wherein: the received geolocations are received in the form of nominal geolocation identifiers; and the instructions to present an authentication user interface include instructions to: receive coordinates indicating locations selected by the user; and convert the coordinates into nominal geolocation identifiers, wherein the instructions include instructions pertaining to nominal geolocation identifiers that are not in the sequence of geolocations of the authentication credential to obfuscate the sequence of geolocations of the authentication credential.

10. The system of any one of embodiments 1-9, wherein the operations comprise: receiving, or instructing the computing device to receive, a user selection of two geolocations; obtaining, or instructing the computing device to obtain, a plurality of routes between the two geolocations; and sending instructions to the computing device that cause the authentication user interface to present user-selectable representations of the plurality of routes, wherein: the received geolocations on the geographic map are specified by a received selection of one of the presented routes; and the sequence of geolocations of the authentication credential specifies a route between stored geolocations; comparing comprises determining whether the received selection of one of the presented routes matches the authentication credential specified route between stored geolocations.

11. The system of embodiment 10, wherein: the plurality of the presented routes comprise: an overlapping subset of the plurality of routes, the overlapping subset including portions of two routes that follow the same geographic path; and non-overlapping subsets of the plurality of routes; and the instructions to present an authentication user interface comprise: instructions by which a selection of an overlapping subset is detected and, in response, the selection is rejected; and instructions by which a selection of a non-overlapping subset is detected and, in response, a selection of a uniquely identified route among the plurality of routes is indicated.

12. The system of any one of embodiments 1-11, wherein: the authentication user interface is configured to receive pan or zoom inputs and respond by changing a map extent of the geographic map.

13. The system of embodiment 12, wherein: data describing features added to the map extent as a result of the panning or zooming inputs is sent to the computing device responsive to the panning or zooming inputs; and the data describing features added to the map extent is obfuscated by: padding data describing the added features to obfuscate the size of data transmission; sending data not being displayed in a resulting map extent to obfuscate which features are added; or a combination thereof.

14. The system of any one of embodiments 1-13, the operations comprising, before receiving the request to authenticate the user, registering the user by effectuating operations comprising: sending instructions to present a registration user interface by which the user selects among types of geolocations, wherein the types of geolocations vary in specificity with which geolocations are identified, and wherein some types of geolocations are sub-regions of other types of geolocations; sending instructions to present a geographic map in the registration user interface; receiving a selection of a first type from among the types of geolocations; receiving a first coordinate indicating a first pixel location or geolocation selected on the pixel location or geolocation map of the registration user interface; determining a first nominal geolocation identifier based on the first type and the first coordinate, the first nominal geolocation identifier specifying one of a plurality of overlapping geographic areas including a geolocation corresponding to the first coordinate; receiving a selection of a second type from among the types of geolocations; receiving a second coordinate indicating a second pixel location or geolocation selected on the geographic map of the registration user interface; determining a second nominal geolocation identifier based on the second type and the second coordinate; and storing both the first nominal geolocation and the second nominal geolocation in the authentication credential.

15. The system of any one of embodiments 1-14, wherein comparing comprises: determining that more than a threshold amount of received geolocations match geolocations of the authentication credential; or determining that less than a threshold amount of geolocations of the authentication credential are absent from the received geolocations.

16. The system of any one of embodiments 1-15, wherein: the instructions to present the authentication user interface comprise steps for converting a coordinate to a nominal geolocation identifier to be performed client-side; or the operations comprise steps for converting a coordinate to a nominal geolocation identifier to be performed server-side.

17. The system of any one of embodiments 1-16, comprising: after sending the result, providing an online resource to the computing device in response to determining that the user is authenticated.

19. A tangible, non-transitory, machine-readable medium storing instructions that when executed by a data processing apparatus cause the data processing apparatus to perform operations comprising: the operations of any one of embodiments 1-17

20. A method comprising: the operations of any one of embodiments 1-17.

What is claimed is:
1. A method, comprising:
obtaining, with one or more processors, a registered user credential, wherein:
the registered user credential demonstrates knowledge of a first set of entries enterable via an authentication user interface,
the first set of entries comprises a plurality of entries,
the first set of entries include locations in a space comprising two spatial dimensions presented in the authentication user interface, and
the registered user credential include a wildcard entry among the first set that matches to a plurality of different entries the authentication user interface is configured to receive;
causing, with one or more processors, the authentication user interface to be presented on a user computing device;
receiving, with one or more processors, an entered user credential provided by a user via the authentication user interface, wherein the entered user credential comprises a second set of selections entered via the authentication user interface and indicating locations in the space comprising two spatial dimensions;
determining, in a first determination, with one or more processors, whether the entered user credential matches the registered user credential by determining whether each entry of the first set other than the wildcard entry has a matching entry in the second set;
determining, in a second determination, with one or more processors, whether to authenticate the user based on a result of the first determination; and
storing, with one or more processors, a result of the second determination in memory.

2. The method of claim 1, wherein:
the two spatial dimensions correspond to latitude and longitude in a geographical map;
the registered user credential specifies a sequence of at least some entries in the first set; and
determining whether the entered user credential matches the registered user credential comprises determining whether at least some entries in the second set are entered in the sequence in the entered user credential.

3. The method of claim 1, wherein:
the wildcard entry specifies an area in the space where entries are to be disregarded when determining whether the entered user credential matches the registered user credential.

4. The method of claim 1, wherein:
the wildcard entry or a plurality of wildcard entries specify a plurality of different areas in the space where entries are to be disregarded when determining whether the entered user credential matches the registered user credential.

5. The method of claim 1, wherein:
at least some entries in the second set specify grid squares of the space.

6. The method of claim 1, wherein:
at least some entries in the second set specify nominal identifiers of areas in the space.

7. The method of claim 6, wherein:
screen coordinates are translated into at least some nominal identifiers on the user computing device before the nominal identifier or value based thereon is sent to an authentication server.

8. The method of claim 7, comprising:
sending instructions to the user computing device that include an event handler and a mapping of areas in the space to nominal identifiers before determining whether the entered user credential matches the registered user credential.

9. The method of claim 6, wherein:
the nominal identifiers include identifiers of a continent, a country, a state, a county, or a ZIP Code.

10. The method of claim 1, wherein:
determining whether the entered user credential matches the registered user credential comprises steps for determining whether a first set of a plurality of two-dimensional probability distributions correspond to a second a second set of a plurality of two-dimensional probability distributions.

11. The method of claim 1, wherein:
determining whether the entered user credential matches the registered user credential comprises:
obtaining a two-dimensional probability distribution corresponding to an entry in the first set of selections; and
determining where an entry in the second set of selections falls within the two-dimensional probability distribution.

12. The method of claim 1, wherein:
determining whether the entered user credential matches the registered user credential comprises:
obtaining a two-dimensional probability distribution corresponding to an entry in the second set of selections; and
determining where an entry in the first set of selections falls within the two-dimensional probability distribution.

13. The method of claim 1, wherein:
the authentication user interface is configured to pan and zoom a display of the space responsive to user inputs to the authentication user interface.

14. The method of claim 1, comprising:
providing an online resource to the computing device in response to determining that the entered user credential matches the registered user credential.

15. The method of claim 14, wherein:
providing the online resource comprises providing an authentication token comprising a cryptographic hash value based on a resource provider account for a resource server of the online resource.

16. A tangible, non-transitory, machine-readable medium storing instructions that when executed by one or more processors effectuate operations comprising:
obtaining, with one or more processors, a registered user credential, wherein:
the registered user credential demonstrates knowledge of a first set of entries enterable via an authentication user interface,
the first set of entries comprises a plurality of entries,
the first set of entries include locations in a space comprising two spatial dimensions presented in the authentication user interface, and
the registered user credential include a wildcard entry among the first set that matches to a plurality of different entries the authentication user interface is configured to receive;
causing, with one or more processors, the authentication user interface to be presented on a user computing device;
receiving, with one or more processors, an entered user credential provided by a user via the authentication user interface, wherein the entered user credential comprises a second set of selections entered via the authentication user interface and indicating locations in the space comprising two spatial dimensions;
determining, in a first determination, with one or more processors, whether the entered user credential matches the registered user credential by determining whether each entry of the first set other than the wildcard entry has a matching entry in the second set;
determining, in a second determination, with one or more processors, whether to authenticate the user based on a result of the first determination; and
storing, with one or more processors, a result of the second determination in memory.

17. The medium of claim 16, wherein:
the two spatial dimensions correspond to latitude and longitude in a geographical map;
the registered user credential specifies a sequence of at least some entries in the first set; and
determining whether the entered user credential matches the registered user credential comprises determining whether at least some entries in the second set are entered in the sequence in the entered user credential.

18. The medium of claim 16, wherein:
the wildcard entry specifies an area in the space where entries are to be disregarded when determining whether the entered user credential matches the registered user credential.

19. The medium of claim 16, wherein:
the wildcard entry or a plurality of wildcard entries specify a plurality of different areas in the space where entries are to be disregarded when determining whether the entered user credential matches the registered user credential.

20. The medium of claim 16, wherein:
at least some entries in the second set specify grid squares of the space.

* * * * *